United States Patent [19]

Berry, III et al.

[11] 4,280,912

[45] Jul. 28, 1981

[54] WATER PURIFICATION UNIT AND METHOD

[75] Inventors: W. James Berry, III, Washington, D.C.; William J. Berry, Durham, N.C.

[73] Assignee: Darco Water Systems, Inc., Durham, N.C.

[21] Appl. No.: 91,452

[22] Filed: Nov. 5, 1979

Related U.S. Application Data

[63] Continuation of Ser. No. 907,926, May 22, 1978, abandoned.

[51] Int. Cl.$^3$ .............................. C02F 1/32; C02F 1/42
[52] U.S. Cl. ..................................... 210/662; 210/663; 210/900; 210/96.1; 210/195.1; 210/266
[58] Field of Search ....................... 210/25, 27, 29, 34, 210/40, 96.1, 167, 195.1, 196, 197, 266, 284, 287, 295, 317, 420–424, 435, 662, 663, 668, 669, 686, 694, 900

[56] References Cited

U.S. PATENT DOCUMENTS

| | | | |
|---|---|---|---|
| 3,276,458 | 10/1966 | Iversen et al. ....................... | 210/167 |
| 3,676,336 | 7/1972 | O'Brien et al. ...................... | 210/96.1 |
| 3,802,563 | 4/1974 | Sasaki et al. ........................ | 210/424 |
| 3,870,033 | 3/1975 | Faylor et al. ........................ | 165/163 |
| 4,064,043 | 12/1977 | Kollman ................................ | 210/40 |

Primary Examiner—Ivars C. Cintins

[57] ABSTRACT

The present invention consists of apparatus for purifying water in a continuous manner which removes suspended, dissolved and organic matter and provides water with a neutral pH and having a minimum electrical resistance of 18 Meg ohms for applications requiring ultra-pure water for research and commercial applications.

4 Claims, 2 Drawing Figures

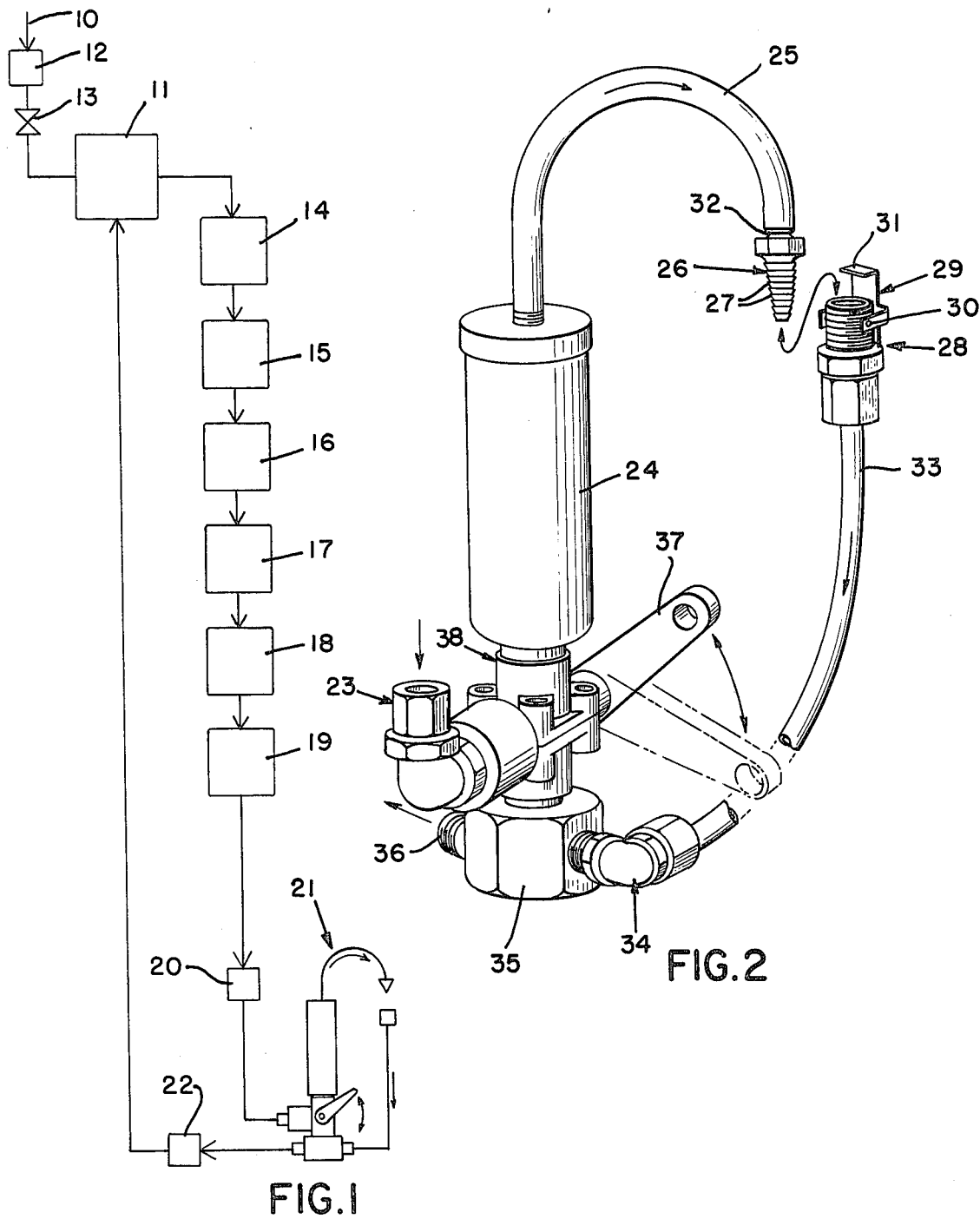

WATER PURIFICATION UNIT AND METHOD

This is a continuation of application Ser. No. 907,926, filed on May 22, 1978, now abandoned.

BACKGROUND AND OBJECTIVES OF THE PRESENT INVENTION

Advances in various technology in recent years have made purer water than was heretofore available a necessity in many commercial and scientific applications. Medical and scientific research, including tissue culture, kidney dialysis, water for injection or serum applications, cosmetic manufacture, and electronic applications have prompted the need for water purified to a much higher degree than the available "water stills" and other distillation apparatus. Various cooling systems, including computers and other machines that require water to transfer heat away from certain functioning parts have led research teams to utilize various methods including ion exchange, reverse osmosis and other techniques to provide water with the purity levels now required and as set forth in the "Type" specifications by various organizations such as the College of American Pathologists (CAP), the National Committee for Clinical Laboratory Standards (NCCLS), the American Society for Testing and Materials (ASTM) and the American Chemical Society (ACS).

Although various commercial water purifying units may at times furnish water sufficient to meet established specifications, there has existed a need for a water purification unit which will meet the most stringent requirements continually over a long period of time and which will provide the first water drawn from the purifying unit to be of the same purity as the water drawn therefrom after it has been allowed to run for a specified time.

Therefore, it is one objective of the present invention to provide a water purifying unit which will economically provide purified water over a long period of time without the need of frequent filter changes or other maintenance operations.

It is another objective of the present invention to provide water purifying apparatus which will remove organic matter and make the water biologically pure.

It is still another objective of the present invention to provide water purifying apparatus which will deliver water having a minimum specific electrical resistance of 18 Meg Ohms/cm at 25° C.

It is still another objective of the present invention to provide an apparatus for purifying water which includes a spigot having a return conduit for continuous circulation.

It is still yet another objective of the present invention to provide a water purifying apparatus which does not have to be purged prior to obtaining purified water therefrom.

It is still yet another objective of the present invention to provide apparatus for purifying water which is relatively maintenance free and requires only periodic attention.

It is still another objective of the present invention to provide purified water with the non-ionized or collodial matter removed.

Another objective of the present invention is to provide purified water which is free of live bacteria and pyrogen in addition to being free of other organic and inorganic materials.

SUMMARY OF THE INVENTION AND DESCRIPTION OF THE DRAWING

The present apparatus consists of an invention for purifying water comprising a series of individual elements which may be connected to a source of tap or other suitable supply for treatment to purified water having a minimum electrical resistance of 18 Meg Ohms/cm and having the following specifications and verification:

| Specifications | Verifications |
| --- | --- |
| pH-Neutral | |
| Minimum electrical resistance - 18 Meg Ohms | NcNab Aqua Purometer IV |
| Flow Rate thru .2 Micron Post Filter | 2-20 Liters/Min |
| Total Organic Carbon- less than 100 ppb | Dohrmann Envirotech DC-54 Low Organics Analyzer |
| Bacteria - none | Plate Count by Acridine Orange Direct Counting Procedure |
| Pyrogen - none | Limulus Amebocyte Lysate (LAL) Test |

As is realized, pure water with its equal disassociation of hydroxyl and hydrogen ions will become contaminated with the smallest amount of impurities as would be available at the reference electrode (KCl) in a typical pH meter. Additionally, chemical indicators would also contaminate pure water and for all practical purposes, conductivity measurements will only deliver a degree of purity with respect to the dissolved ionic contaminants.

Regarding the electrical resistance of the purified water, it has been found entirely satisfactory to utilize a McNab Aqua Purometer IV for this purpose as manufactured by McNab, Inc. of Mount Vernon, N.Y. although other instruments of equal reliability may be employed.

It has been found desirable to have a flow rate of 2-20 liters per minute for the purification equipment as the amounts in these ranges have been found to be satisfactory for most laboratory and commercial applications and if a greater supply of purified water is required, then additional purifying apparatus units can be installed.

The total volatile organic carbon of the purified water of the present invention has been found to be less than 10 ppb when analyzed with a Dohrmann Envirotech DC-54 Ultraflow Organics Analyzer by purging all volatile organic carbon from a 10 ml sample of the water by utilization of helium. The sample is then oxidized by persulfate in the presence of a high intensity ultraviolet light resulting in $CO_2$ measured after a catalytic reduction to methane by a flame ionization detector. Blanks are obtained by running a sample through the instruments, removing all carbon, and having it flow backward through the machine and running again. Typical blank values for the best deionized-distilled u.v. treated, chlorine oxide water is on the order of 100 ppb.

The bacteria of the purified water from the present invention was determined by analyzing samples by the Acridine Orange Direct Counting Procedure as described by Hobbie et al (*Environmental and Applied Microbiology* 33:1225–1228, 1977). Special care was taken to have all solutions particle free and in each case 10 ml of water was examined.

The pyrogen content of the purified water was examined by utilization of a Limulus Amebocyte Lysate (LAL) test. Of the various LAL tests, the pyrostat procedure is believed superior since the reaction mixture employed is read spectrophotometrically although the gel test may also be employed.

The apparatus of the present invention includes a pump for purifying tap water or other water having a minimum electrical resistance of 500,000 ohms/cm. The pump delivers the potable tap water to a monitor and control element which automatically stops the flow of the supply water if the water drops in its electrical resistance below the 500,000 ohm figure.

Next, the water passes from the monitor and control element to a bed of adsorbant carbonaceous resin which removes the dissolved organic contaminants from the water. Thereafter, the water passes to an ion-exchange resin bed having both anion and cation resins which remove the undesirable ionic materials. After treatment in the mixed ionic resin bed, the water then passes through an ultraviolet light source which radiates the water with wave lengths in the 2537 angstrom range to destroy bacteria. Subsequently the water passes to a temperature control tank which cools the water which may have become heated as a result of the ultraviolet radiation. After the water passes through the cooling element or zone, it is then directed to a mixed ion resin bed for "polishing" or pyrogen removal. Thereafter, the water passes through a conductivity meter whereby an observer can determine the purity of the water prior to its removal from the system for laboratory or other uses.

After leaving the conductivity area, the water passes into a spigot means whereby the desired amount of purified water can be removed, or until such time as the purified water is needed, the spigot means allows recirculating of the water through a flow indicator back to the pump. Thus, the spigot means as constructed allows completely purified water to be available at any moment and does not require purging or draining prior to obtaining water of the optimum quality.

Turning now to the drawings,

FIG. 1 demonstrates the preferred embodiment of the combination of elements in schematic fashion; and FIG. 2 illustrates an enlarged view of the preferred spigot means.

For a more detailed description of the invention, FIG. 1 shows potable water from a tap or other means depicted by arrow 10 which is forced by pump means 11 to prefilter means 12 of a conventional cartridge type and through pressure control valve 13 which prevents the water pressure from becoming too great or dropping below a minimum pressure per square inch. As has been mentioned before, the prefilter and other elements of the present invention may be modified as required depending upon the particular water supply utilized. Of course, no prefiltration may be required if water is supplied from a distillation unit or other source which meets the requirements for ASTM Type IV water.

Next, the water which enters the pump means 11 is directed to a monitoring and control element 14 which shuts the system off if water having an electrical resistance of less than 500,000 Ohm/cm is determined. This control element consists of a conventional low scale conductivity meter and an electrical gate valve which closes when the water's resistance falls below 500,000 Ohm/cm, thus stopping the water supply before it reaches the pump 11.

Water passes from the monitoring and control element 14 to a carbonaceous resin bed 15. The carbonaceous resin that has been found to be entirely satisfactory for this purpose is Ambersorb XE-348 manufactured by Rohm and Haas Company, though other resins and adsorbants may be found to be satisfactory. However, the XE-348 carbonaceous adsorbant has been found to do a particularly good job of removing polar organic materials including phenolics from the water.

The water thus treated passes from the carbonaceous resin bed 15 to a mixed bed ion-exchange means 16, which may be, for example, composed of an anion resin type, such as Rohm and Haas Amberlite 410 and a cation type such as Rohm and Haas Amberlite IR-120, although other mixed bed resins may be employed with similar success. The mixed ion-exchange bed removes undesirable ions from the water as is conventionally understood by those skilled in the water treatment art.

Next, the water passes from the mixed ionic exchange resin means 16 to a source 17 of ultraviolet radiation. The ultraviolet light generated by this element of the water purification apparatus is in the wave length range of 2537 angstroms with the flow rate past the u.v. source calculated to provide a sufficient exposure to sterilize the water and kill all life therein such as bacteria, mold, virus, algae, protozoa and other types of micro-organisms. As is understood, the ultraviolet energy emitted from a particular source may be expressed as micro-watt second per $cm^2$ or "ultrads" which is a product of energy, time and area as discussed in Technical Bulletin No. 67-6 (October, 1970) of Ultradynamics of Los Angeles, Calif. Depending upon the flow rate desired and other criteria, it is desirable to completely destroy the organisms which may be present to obtain water with the desired purity.

After the water has been suitably radiated by the ultraviolet radiation source 17 the water then passes to a temperature control unit 18 which maintains the water temperature at 25° C. It has been found that water kept at this temperature, particularly during recirculation, prevents a favorable environment for growth of molds and bacteria.

Next, the water passes to resin polishing bed 19 which consists of a mixed bed ion-exchange resin and an additional adsorbant resin such as one of the variety of Ambersorb resins of Rohm and Haas. The particular resin employed is selected by the requirements needed depending upon the water source utilized and contaminants available.

Water thus treated then passes from the polishing bed 19 to a conductivity meter 20 which allows an observer to witness the electrical resistance in Meg Ohms/cm of the water and may be, for example, an Aqua Purometer IV to insure water of a minimum 18 Meg Ohms/cm purity at all times.

The water passes from the conductivity meter to a spigot means 21 as will be described in detail below. Water not dispensed circulates through spigot means 21 and passes through flow meter 22 which may be of any conventional type to demonstrate the rate of return to pump means 11. Of course, when spigot means 21 is not opened to dispense purified water, pump means 11 recirculates the water and no additional water is added from water supply 10. By this method, purified water is continually available to the user and there is no delay or need for waiting for additional water to be purified if the amount in the system at any one time is exhausted since pump means 11 continually supplies additional water for purification treatment.

Spigot means 21 provides an outlet in the water purification system and because it is located "in-stream" there is no need to purge the spigot means or allow the water to run several seconds before obtaining a specified quantity for usage.

As shown in FIG. 2, spigot means 21 consists of an inlet means 23 to which the incoming water may pass to a 0.2 micron filter 24 which is utilized to remove any particular matter including dead bacteria. It has been found that a cellulose acetate membrane of 0.2 microns is satisfactory to remove organic, inorganic or colloidal particles and the cellulose acetate membrane may be in the form of a cartridge for ease of maintenance or exchange as required. For particular applications other micron sizes other than the 0.2 micron size may be found satisfactory for a particular application or contaminants.

The water which is passed through the 0.2 micron filter then passes through a curved neckpiece 25 which is equipped with an outlet tip 26 of conventional design having ribs 27 for gripping and frictionally engaging tubing (not shown) which may be attached to outlet tip 26.

Coupling means 28 is shown in FIG. 2 disengaged from outlet tip 26. Coupling means 28 has a latch member 29 which is resiliently mounted to coupling means 28 and pivots through axle point 30 to securely engage outlet tip 26 when connected thereto. When the outlet tip 26 and the coupling means 28 are connected together latch lip 31 is cooperatively received in tip groove 32 for firm engagement therewith.

Water flowing through coupling means 28 passes through tubing means 33 into "L" member 34 and through base conduit 35 to outlet means 36 where the water then passes through the flow indicator (not shown in FIG. 2) and back to the pump means 11.

Valve handle 37 controls a three-way ball valve located in valve housing 38. As shown in FIG. 2, valve handle 37 is shown in its upright position approximately 45° above the horizon whereupon water entering inlet means 23 will flow through micron filter 24 and into the neckpiece 25 for withdrawal of water by disengagement of coupling means 28 or for recirculation with coupling means 28 attached to outlet tip 26. Should it be desirable to recirculate the water entering inlet means 23 without passing it through filter means 24, then handle 37 should be placed in its downward position, shown in FIG. 2 by the dotted-line representation at approximately 15° below the horizon.

Valve handle 35 will open the valve to allow passage into filter means 24 at approximately a horizontal position and as the valve handle 37 is raised from its horizontal position to approximately 45° above the horizon, the flow rate increases through filter means 24.

As shown, spigot means 21 allows the purified water to recirculate constantly through curved neckpiece 25 and therefore no purging or cleansing of outlet tip 26 is necessary for delivering purified water at any time. When a user desires purified water, he can merely press valve handle 37 to its downward position, disengage coupling means 28 from outlet tip 26, place a beaker or other container under outlet tip 26 and lift handle 37 to a horizontal or upright position. When the container is filled, valve handle 37 is turned to its downward position, coupling means 28 reaffixed to outlet tip 26 and handle means 37 is again raised for recirculation through outlet tip 26 and coupling means 28 to provide readily available purified water for future needs.

Various modifications to the water purifying apparatus can be made and the examples and drawings shown are not for limiting purposes.

We claim:

1. Apparatus for purifying water comprising: a water supply, a pump means in communication with said water supply for directing water to successive elements of a purifying circuit including a monitoring means, a carbonaceous resin means, a first ion-exchange means, an ultraviolet light means, a temperature control means, said temperature control means communicating with said ultraviolet light means, said temperature control means including cooling elements for lowering the temperature of the water received from said ultraviolet light means, a second ion-exchange means for receiving the water passing from said temperature control means, an outlet means, said outlet means including a filter means and a quick disconnect coupling unit, a water return means including a conduit from said outlet means to said pump means, said water return means including a spigot means having recirculating ability comprising; an inlet means for maintaining fluid communication with a fluid supply, an adjustable valve means for directing fluid entering said inlet means through either first or second outlet means, said first outlet means including a pre-filtering means, an outlet tip joined to said pre-filtering means for providing fluid therefrom, coupling means engageable with said outlet tip, said coupling means communicating with said second outlet means whereby said fluid passing through said outlet tip with said coupling means engaged is returned to the fluid supply.

2. Apparatus as claimed in claim 1 wherein said pre-filtering means comprises a 0.2 micron filter.

3. Apparatus as claimed in claim 2 wherein said first outlet means contains a return conduit.

4. A method for the purification of water comprising: subjecting said water to be purified to a monitoring device which permits the passage of water having an electrical resistance of 500,000 ohms or greater, subjecting said passed water to a first mixed ion-exchange means for deionization, directing said deionized water to an ultraviolet lamp for radiation, lowering the temperature of said radiated water by passing said radiated water through cooling means, directing the cooled water to a second ion-exchange means, and filtering said ion-exchanged water with a micron filter.

* * * * *